3,081,273
SOLUTION OF TEREPHTHALAMIDE POLYMER IN SOLVENT COMPRISING ANTIMONY TRICHLORIDE AND PROCESS FOR PREPARING SAME

Amerigo F. Caprio, Chatham, N.J., assignor to Celanese Corporation of America, New York, N.Y., a corporation of Delaware
No Drawing. Filed July 13, 1960, Ser. No. 42,510
11 Claims. (Cl. 260—29.1)

This invention relates to an improved process for the formation of shaped articles such as filaments from high molecular weight polyterephthalamides.

The high molecular weight polyterephthalamides possess various characteristics which are considered desirable for the formation of shaped articles such as filaments. Some of these characteristics are, for example, good mechanical properties such as high tenacity and elongation and a high degree of dye receptivity, water insensitivity and glaze resistance, which combination of properties is not often found in the more widely-used fiber-forming polymers. However, the polyterephthalamides, especially those melting above 275° C., cannot be as easily melt spun as many of these more widely used polymers, because of their tendency on being heated to a degree sufficient to melt them to seriously degrade and/or further polymerize to a useless, infusible mass. Thus, any method which can be used to form shaped articles of high molecular weight polyterephthalamides while avoiding the difficulties of melt spinning set out above is much to be desired.

It is an object of this invention to provide a method of forming useful shaped articles, e.g., filaments, from high molecular weight polyterephthalamides. It is a further object of this invention to provide a method of forming shaped articles from polyterephthalamides while avoiding the difficulties of melt spinning this type of polymer. Other objects will be apparent from the following detailed description and claims.

In accordance with one aspect of the invention, a high molecular weight polyterephthalamide is dissolved in a solvent comprising at least 70% by weight of antimony trichloride. The solvent may be, for example, molten antimony trichloride per se in which case the solution is prepared at a temperature above 73° C., the melting point of antimony trichloride, or the solvent may contain up to 30% by weight of a diluent, e.g. acetone, which acts to lower the solidification temperature of the solution. The solution may be extruded through a suitably shaped opening, e.g. the orifices of a spinnerette to form filaments or a slot shaped opening to form films.

The process of this invention may be applied, for example, to fiber- and film-forming linear polyterephthalamides having repeating structural units of the formula

which result from the condensation of terephthalic acid or a derivative, e.g. an ester, acyl-halide or salt of such acid, with a diamine, where the R's are hydrogen or monovalent organic radicals, e.g. lower alkyl such as methyl or ethyl, and Y is a divalent organic radical such as alkylene containing 1 to 10 carbon atoms, e.g., ethylene, tetramethylene or hexamethylene, arylene such as para- or meta-phenylene, para-xylylene or para-diethylene benzene, cycloalkylene such as 1,4-cyclohexylene or divalent heterocyclic radicals such as those derived from piperazine or an alkyl-substituted piperazine wherein the open bonds are attached to nitrogen atoms.

Particularly suitable are the poly (polymethylene) terephthalamides wherein the polymethylene groups contain 1 to 10 carbon atoms, e.g. polyhexamethylene terephthalamide, polytetramethylene terephthalamide, polyethylene terephthalamide and polypiperazylene terephthalamide, i.e. derived from piperazine and terephthaloyl chloride.

The solutions formed in accordance with this invention may contain for example 5 to 30%, preferably 10 to 25% of polymer based on the weight of the solution. The solutions may be prepared at a temperature within a wide range, e.g. 20 to 150° C., and may be extruded to form shaped articles at a temperature, for example, of 20 to 150° C.

A wide variety of liquids in which the polymer is insoluble may be used as the coagulating bath in the formation of shaped articles from the solutions of the invention, e.g. tetrahydrofuran, water, acetone, ethyl acetate or methyl, ethyl or isopropyl alcohol.

The following examples further illustrate the invention.

Example I

Polyhexamethylene terephthalamide having an inherent viscosity of 1.29 measured as a 0.1% solution in 97% sulfuric acid and prepared by the interfacial technique from hexamethylene diamine and terephthaloyl chloride using magnesium oxide as an acid binder, as described in application Serial No. 6,885, filed February 5, 1960, by Jamison, was dissolved in molten antimony trichloride heated to 120° C. in an oil bath to yield a solution containing 10% by weight of polymer. The solution was extruded through a 0.1 mm. jet at 90° C. into tetrahydrofuran to yield a useful filament of over 100 denier.

Useful filaments were also obtained when the solution of this example was similarly extruded into water, isopropyl alcohol, and acetone.

The polymer of this example was also dissolved in molten antimony trichloride to yield a solution containing 20% by weight of polymer which could similarly be formed into useful filaments.

Example II

The procedure of Example I was repeated except that the polymer was polypiperazylene terephthalamide prepared by condensing piperazine and terephthaloyl chloride by the interfacial technique, using the procedure indicated in Example I. The solutions could be formed into useful filaments using the same non-solvent coagulating liquids as were used for the polymer of Example I.

It is to be understood that the foregoing detailed description is given merely by way of illustration and that many variations may be made therein without departing from the spirit of my invention.

Having described my invention what I desire to secure by Letters Patent is:

1. A process comprising dissolving a high molecular weight polyterephthalamide containing repeating structural units of the formula

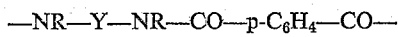

where R is selected from the group consisting of hydrogen and a monovalent organic radical and Y is a divalent organic radical, in a solvent comprising antimony trichloride and extruding the resulting solution through an opening of predetermined cross-section to form a shaped article.

2. The process of claim 1 wherein said solution contains 5 to 30% by weight of polymer and is extruded into a liquid non-solvent for the polymer.

3. The process of claim 1 wherein said shaped article is a filament.

4. The process of claim 1 wherein the melting point of the polymer is at least 275° C.

5. The process of claim 1 wherein Y is a polymethylene group containing 1 to 10 carbon atoms.

6. The process of claim 4 wherein said polymer is polyhexamethylene terephthalamide.

7. A composition comprising a high molecular weight polyterephthalamide containing repeating structural units of the formula —NR—Y—NR—CO—p-$C_6H_4$—CO— where R is selected from the group consisting of hydrogen and a monovalent organic radical and Y is a divalent organic radical, dissolved in a solvent comprising antimony trichloride.

8. The solution of claim 7 wherein said antimony trichloride is present in an amount of at least 70% by weight of the solvent, said solvent containing up to 30% of a diluent.

9. The solution of claim 7 where said polymer has a melting point of at least 275° C.

10. The solution of claim 7 wherein said polymer contains repeating structural units of the formula —NH—Y—NH—CO—p-$C_6H_4$—CO— where Y is a polymethylene group containing 1 to 10 carbon atoms.

11. The solution of claim 10 wherein said polymer is polyhexamethylene terephthalamide.

References Cited in the file of this patent

UNITED STATES PATENTS

| | | |
|---|---|---|
| 2,404,713 | Houtz | July 23, 1946 |
| 2,502,030 | Scheiderbauer | Mar. 28, 1950 |
| 2,648,592 | Stanton et al. | Aug. 11, 1953 |
| 2,949,440 | Katz | Aug. 16, 1960 |